United States Patent
Twumasi-Boakye et al.

(10) Patent No.: US 11,958,499 B2
(45) Date of Patent: Apr. 16, 2024

(54) SYSTEMS AND METHODS TO CLASSIFY A ROAD BASED ON A LEVEL OF SUPPPORT OFFERED BY THE ROAD FOR AUTONOMOUS DRIVING OPERATIONS

(71) Applicant: Ford Global Technologies, LLC, Dearborn, MI (US)

(72) Inventors: Richard Twumasi-Boakye, Taylor, MI (US); Xiaolin Cai, Ann Arbor, MI (US); Shan Chy Chueh, Ypsilanti, MI (US); James Fishelson, Ypsilanti, MI (US); Archak Mittal, Canton, MI (US); Andrea Broaddus, Berkeley, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 17/321,577

(22) Filed: May 17, 2021

(65) Prior Publication Data
US 2022/0363287 A1 Nov. 17, 2022

(51) Int. Cl.
*B60W 60/00* (2020.01)

(52) U.S. Cl.
CPC ....... *B60W 60/001* (2020.02); *B60W 2552/20* (2020.02); *B60W 2552/35* (2020.02); *B60W 2555/20* (2020.02)

(58) Field of Classification Search
CPC combination set(s) only.
See application file for complete search history.

(56) References Cited

U.S. PATENT DOCUMENTS

| | | | |
|---|---|---|---|
| 10,036,648 B1 | 7/2018 | Hobbs et al. | |
| 2015/0178998 A1 | 6/2015 | Attard et al. | |
| 2016/0275404 A1* | 9/2016 | Abraham | G08G 1/202 |
| 2018/0004211 A1* | 1/2018 | Grimm | G06Q 10/047 |
| 2019/0248379 A1 | 8/2019 | Peterson et al. | |
| 2019/0294167 A1* | 9/2019 | Kutila | G08G 1/096791 |

OTHER PUBLICATIONS

Jaycil Z. Varghese et al., "Overview of Autonomous Vehicle Sensors and Systems", 2015 International Conference on Operations Excellence and Service Engineering, IEOM Society, Orlando, FL., Sep. 10-11, 2015, 14 pages.

* cited by examiner

*Primary Examiner* — Vivek D Koppikar
*Assistant Examiner* — Jeffrey R Chalhoub
(74) *Attorney, Agent, or Firm* — Brandon Hicks; Eversheds Sutherland (US) LLP

(57) ABSTRACT

The disclosure generally pertains to systems and methods to classify a road based on a level of support offered by the road for autonomous driving operations. An example method may involve a computer receiving sensor data from a vehicle, the sensor data containing information about a current functional condition of a road. The computer may predict a future functional condition of the road by using a deterioration model to evaluate the sensor data. The computer may then determine a level of support offered by the road for autonomous driving operations based on the future functional condition of the road, and assign a classification to the road based on the level of support offered by the road for autonomous driving operations. The level of support offered by the road for autonomous driving operations may also be based on items such as road markings, traffic signs, traffic signals, and/or infrastructure elements.

19 Claims, 5 Drawing Sheets

| Deterioration Level | Description |
|---|---|
| 1 | No damage |
| 2 | Nano damage |
| 3 | Micro damage |
| 4 | Minor damage |
| 5 | Moderate damage |
| 6 | Major damage |
| 7 | Unusable |

FIG. 3

SYSTEMS AND METHODS TO CLASSIFY A ROAD BASED ON A LEVEL OF SUPPPORT OFFERED BY THE ROAD FOR AUTONOMOUS DRIVING OPERATIONS

BACKGROUND

Deployment of an autonomous vehicle on a road not only depends on the equipment provided in the autonomous vehicle but also on the characteristics of the road and of various road markings, traffic signs, and traffic lights that are used by the autonomous vehicle. Some items such as, for example, painted lane markings on the road, or a surface material of the road, can deteriorate over time. It may therefore be difficult to determine ahead of time whether a road is optimal for travel by an autonomous vehicle. Consequently, it is desirable to provide a solution to address this issue.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 shows an example table illustrating various levels that may be used to characterize deterioration of an object in accordance with an embodiment of the disclosure.

DETAILED DESCRIPTION

Overview

Figure 1:
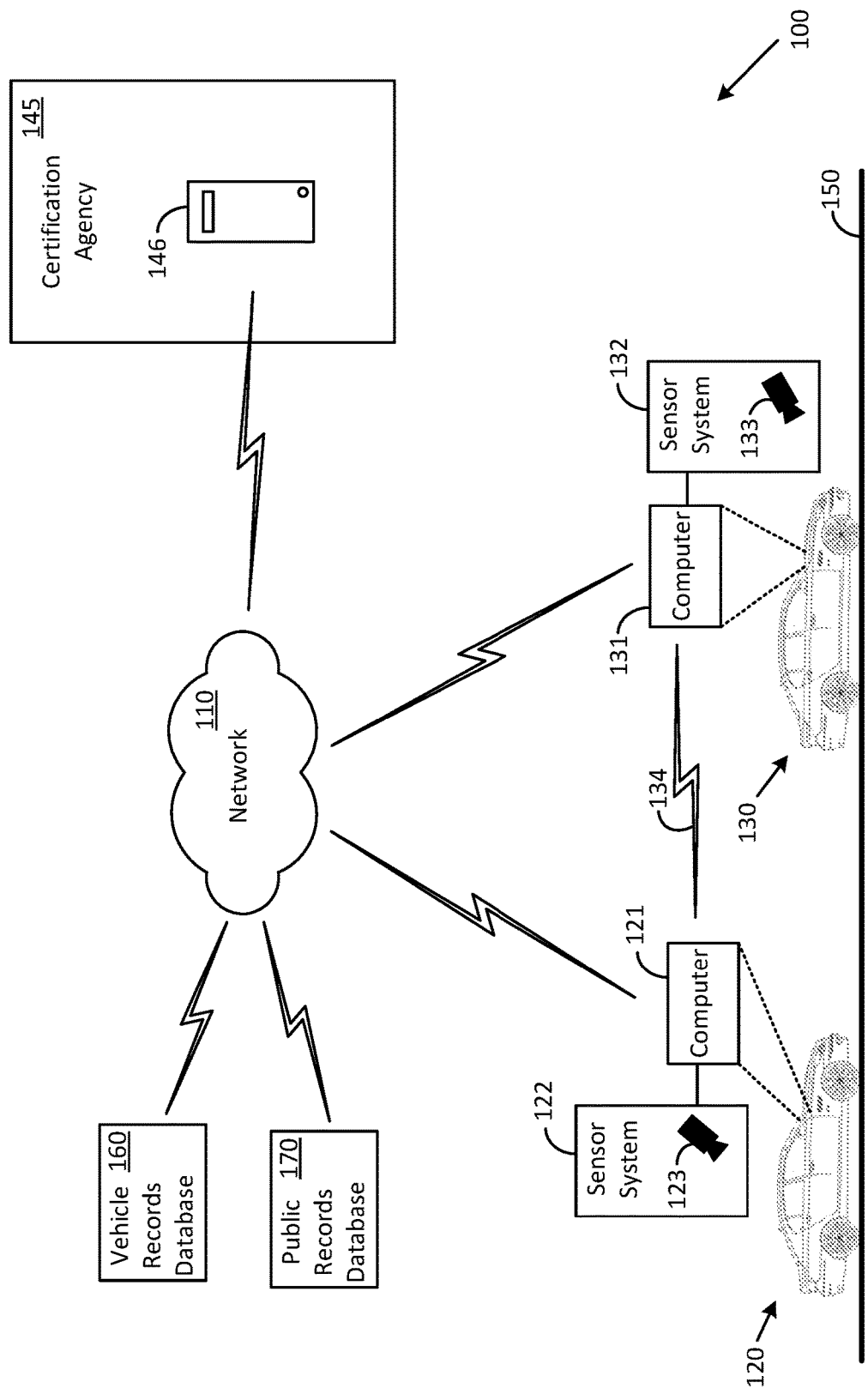
FIG. 1 shows an example system that can be used operations in accordance with an embodiment of the disclosure to classify a road based on a level of support offered by the road for autonomous driving operations.

The disclosure generally pertains to systems and methods to classify a road based on a level of support offered by the road for autonomous driving operations. An example method for classifying a road may involve a computer receiving sensor data from a vehicle. The sensor data may contain information about a current functional condition of a road. The computer may predict a future functional condition of the road by using a deterioration model to evaluate the sensor data. In one case, the deterioration model may be based on an effect of an environmental condition upon a road surface over a period of time. The computer may determine a level of support offered by the road for autonomous driving operations based on the future functional condition of the road, and then assign a classification to the road based on the level of support offered by the road. The level of support offered by the road for autonomous driving operations may be also based on items such as, for example, road markings, traffic signs, traffic signals, and/or infrastructure elements. Based on the level of support offered by the road (or portion of the road), the system may autonomously reroute the vehicle to a different road that has a more optical level of support for autonomous driving operations.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. The word "example" as used herein is intended to be non-exclusionary and non-limiting in nature.

FIG. 1 shows an example system 100 that can be used operations in accordance with an embodiment of the disclosure to classify a road 150 based on a level of support offered by the road 150 for autonomous driving. The system 100 may include a road classification system 145, a vehicle records database 160, and a public records database 170.

The road classification system 145 may include one or more computers communicatively coupled to a network 110, such as, for example, a computer 146 that is communicatively coupled to the network 110. Each of the vehicle records database 160 and the public records database 170 may also include one or more computers (not shown) that are communicatively coupled to the network 110. The various computers may be any of various types of computers containing a processor and a memory, such as, for example, a desktop computer, a laptop computer, a tablet computer, a server computer, a client computer, or a handheld device (a smartphone, for example).

The network 110 may include any one network, or a combination of networks, such as, for example, a local area network (LAN), a wide area network (WAN), a telephone network, a cellular network, a cable network, a wireless network, and/or private/public networks such as the Internet. The various components that are communicatively coupled to the network 110 may communicate with each other by using various communication technologies such as, for example, TCP/IP, Bluetooth, cellular, near-field communication (NFC), Wi-Fi, Wi-Fi direct, vehicle-to-vehicle (V2V) communication, and/or vehicle-to-infrastructure (V2I) communication.

A vehicle 120 and a vehicle 130 are two example vehicles shown traveling on the road 150. Each of the vehicle 120 and the vehicle 130 can be any of various types of vehicles, such as, for example, a truck, a semi-trailer, a flatbed, a car, a van, a sports utility vehicle, and a bus. In an example embodiment, the vehicle 120 and/or the vehicle 130 is an autonomous vehicle. It must be understood that the label "autonomous vehicle" as used in this disclosure generally refers to a vehicle that can perform at least a few operations without human intervention.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

The description provided herein with reference to an "autonomous vehicle" is applicable to Level 2 through Level 5 vehicles and may be applicable to certain types of Level 0 and Level 1 vehicles as well. The Level 0 and Level 1 vehicles may be equipped with sensors that are arranged to detect functional conditions of the road 150 and/or of various objects (such as, for example, traffic signs and traffic signals) that are pertinent to usage of the road 150 by autonomous vehicles (Level 2 through Level 5).

The vehicle 120 is generally configured to have an autonomous driving capability and can include equipment such as, for example, a computer 121 and a sensor system 122. The computer 121 may include a communication system that allows the computer 121 to communicate with various devices either via the network 110 (such as, for example, the computer 146) or directly via vehicle-to-vehicle (V2V) wireless communications (such as, for example, with a computer 131 of the vehicle 130 via a V2V wireless communication link 134).

In an example implementation, the computer 121 is configured to execute operations such as receiving sensor data from the sensor system 122, embedding the sensor data in a communication signal, and propagating the communication signal containing the sensor data to devices such as the computer 146. The computer 146 is configured in accordance with disclosure to execute a software-based classification procedure to evaluate the sensor data to determine a level of support provided by the road 150 for autonomous driving operations.

In another example implementation, the computer 121 is configured in accordance with disclosure to execute the software-based classification procedure to evaluate the sensor data and determine the level of support provided by the road 150 for autonomous driving operations. The results of the classification procedure may then be propagated to the computer 146 and/or to the public records database 170.

The sensor system 122 may include various sensor devices such as for example, a camera 123, a radar device, a light detection and ranging (LIDAR) device, and an Internet-of-Things (IoT) sensor. The sensor devices are arranged to capture data that provides information pertaining to a functional condition of the road 150 and/or to obtain information pertaining to various objects that support autonomous driving operations.

In an example implementation, data provided by the camera 123, in the form of images of the road 150, may be evaluated by the computer 146 and/or the computer 121 for obtaining information pertaining to the functional condition of the road 150 (smooth, bumpy, pot-holed, slick, cement, tarmac, asphalt, gravel, dirt, cobblestones, etc.). Data provided by the camera 123, in the form of images of various objects, may be evaluated by the computer 146 and/or the computer 121 for obtaining information pertaining to, for example, painted markings, reflectors, median areas, white lines, yellow lines, dashed lines, solid lines, turn lanes, road dividers, shoulders, exit lanes, exit signs, pedestrian crossing markings, pedestrian crossing signs, traffic signs, traffic signals and/or infrastructure elements that support autonomous driving operations.

In an example embodiment in accordance with the disclosure, the vehicle 130 may be configured substantially similar to the vehicle 120. Accordingly, the computer 131 may be substantially similar to the computer 121 and the sensor system 132 may be substantially similar to the sensor system 122 (the camera 133 may be substantially similar to the camera 133).

The vehicle records database 160 can contain data that provides various types of information pertaining to various vehicles (including the vehicle 120 and the vehicle 130). The data may provide, for example, information pertaining to vehicle ownership, vehicle maintenance, and accidents. Such information may be fetched by the computer 146 and/or other computers, and used to determine a roadworthiness of a vehicle. In an example scenario, the computer 146 may access the vehicle records database 160 to obtain data pertaining to the vehicle 120. The data may be evaluated by the computer 146 to identify features and capabilities of the vehicle 120 such as, for example, an autonomous driving capability of the vehicle 120. The computer 146 may, for example, identify the vehicle 120 as a Level 5 autonomous vehicle that has been maintained in excellent condition over a period of time (5 years, for example) or as a Level 1 vehicle that has been poorly maintained.

The public records database 170 can contain data that provides various types of information pertaining to various structures such as roads and highways. The public records database 170 can contain, for example, records of roadwork performed on the road 150 (painting, repaving, pothole filling, adding lanes, re-routing, additional construction, etc.) and records pertaining to infrastructure objects associated with the road 150 such as, for example traffic signs and traffic lights (addition, removal, maintenance, etc.). Data obtained from the public records database 170 may be evaluated by the computer 146, and/or other computers, to determine a road-worthiness of a road, particularly with reference to support offered by the road for autonomous driving operations. In an example scenario, the computer 146 may access the public records database 170 to obtain data pertaining to the road 150. The computer 146 may evaluate the data and classify the road 150 as capable of supporting certain types of autonomous driving operations.

Figure 2:
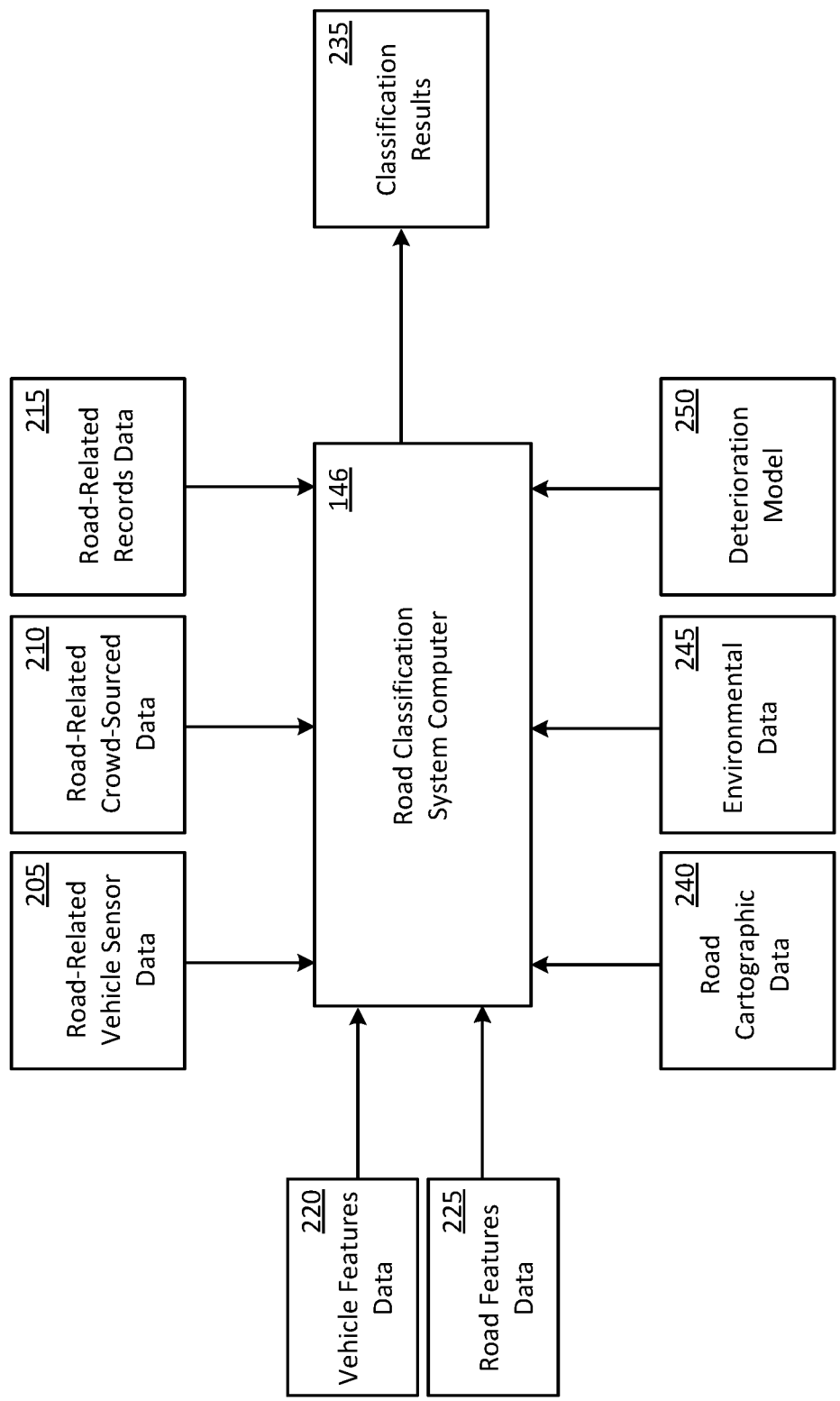
FIG. 2 shows a block diagram of various inputs that can be provided to a road classification system computer in accordance with an embodiment of the disclosure.

FIG. 2 shows a block diagram of various inputs that can be provided to a road classification system computer such as, for example, the computer 146, in accordance with an embodiment of the disclosure. The various inputs can include road-related vehicle sensor data 205, road-related crowd sourced data 210, road-related records data 215, vehicle features data 220, road features data 225, road cartographic data 240, environmental data 245, and a deterioration model 250. The computer 146 may evaluate some or all of these inputs to produce classification results 235 that may include a classification of a road (such as, the road 150) based on a level of support offered by the road for autonomous driving operations.

The classification results 235 may further provide information related to various items (particularly with respect to autonomous driving operations) such as, for example, evaluating a current functional condition of a road, predicting a future functional condition of a road, predicting a rate of deterioration of a road over time, identifying a cause for a deterioration of a road, recommending a repair of a road to address a current and/or a future deterioration of the road, identifying an issue with an infrastructure object (a traffic light, for example), recommending a way to address the issue.

The road-related vehicle sensor data 205 may be provided to the computer 146 by various sources such as, for example, the sensor system 122 (via the computer 121) and/or the sensor system 132 (via the computer 131).

Road-related crowd sourced data 210 may be provided to the computer 146 by sources such as, for example, vehicle computers that are in communication with each other and/or vehicle occupants (drivers and/or passengers) that are in communication with each other. In an example scenario, the computer 121 may obtain road-related information from the computer 131 and propagate the road-related information to the computer 146. The road-related information obtained by the computer 121 from the computer 131 (such as, for example, sensor data generated by the sensor system 132) may be different than road-related information obtained by the computer 131 from the sensor system 122. The sensor data may be different for various reasons such as, for example, because the vehicle 130 is traveling on a first segment of the road 150 and the vehicle 120 is traveling on a second segment of the road 150 where the road conditions and/or environmental conditions are different. In another example scenario, the computer 121 may obtain road-related information from vehicle occupants such as, for example, road-related information pertaining to road conditions and/or environmental conditions (rain, icy weather, snow etc.) on the first segment of the road 150 as reported to the computer 146 by a driver of the vehicle 120 (via the computer 121 or via a smartphone, for example) that may be different than road conditions and/or environmental conditions on the second segment of the road 150 as reported to the computer 146 by a driver of the vehicle 130.

The vehicle features data 220, the road-related records data 215, the road features data 225, the road cartographic data 240, and/or the environmental data 245 may be obtained by the computer 146 from sources such as the vehicle records database 160 and the public records database 170. The vehicle features data 220 may provide information pertaining to an autonomous driving capability of a vehicle. The road-related records data 215 may provide information pertaining to a current functional condition of a road and roadwork performed on the road (painting, repaving, pothole filling, adding lanes, re-routing, additional construction, etc.). The road features data 225 may provide information pertaining to features of a road such as, for example, terrain and shape (hilly, flat, curvy, etc.). The road cartographic data 240 may include map information pertaining to a road such as, for example, a route that extends from a first geographic region having a first type of weather (hot, for example) to a second geographic region having a second type of weather (snowy, for example) during various times of the year. Environmental data 245 may include information pertaining to the weather at various locations on a road at various times.

The computer 146 may include various components such as, for example, a processor, a communications system, and a memory. The communications system is configured to allow the computer 146 to communicate with various devices, such as, for example, the computer 121 in the vehicle 120, the computer 131 in the vehicle 130, the vehicle records database 160, and/or the vehicle records database 160. The memory is one example of a non-transitory computer-readable medium that may be used to store an operating system and various code modules such as, for example, a road classification module. The code modules are provided in the form of computer-executable instructions that can be executed by the processor for performing various operations in accordance with the disclosure.

The road classification module may be executed by the processor to perform a prediction procedure that predicts a future functional condition of a road based on evaluating sensor data pertaining to a current functional condition of the road and/or based on other inputs such as, for example, an effect of an environmental condition upon a road surface over a period of time. The prediction procedure may use the deterioration model 250 that can include techniques/algorithms based on artificial intelligence, Markov decision processes, reinforcement learning, and learning based on past states. Some or all of the road-related vehicle sensor data 205, road-related crowd sourced data 210, road-related records data 215, vehicle features data 220, road features data 225, road cartographic data 240, and/or environmental data 245 may be evaluated individually, or in combined form, to classify some or all portions of a road. In some cases, a first segment of the road 150 may be assigned a first type of classification based on a level of support offered by the first segment for autonomous driving operation. A second segment of the road 150 may be assigned a second type of classification based on a different level of support offered by the second segment for autonomous driving operation.

In an example implementation, the prediction procedure may be executed in the form of a simulation procedure where various inputs are based on simulation values. In some cases, the simulation values may be based on historical data obtained from the vehicle records database 160 and/or the public records database 170. In some other cases, the simulation procedure can use data obtained from a vehicle computer, such as, for example, the computer 121.

In some cases, the classification of various road segments may be updated in real time based on changing conditions, such as, for example, changing weather conditions. In some other cases, the classification may be updated periodically, intermittently, and/or on as as-needed basis. In an example implementation, an aggregated autonomous driving index may be generated by the computer 146 for the road 150 based on the classification of various segments of the road 150. In an example implementation, the classification results 235 may be propagated to, and stored in, the public records database 170.

An autonomous vehicle may communicate with the computer 146 and/or the public records database 170 to obtain classification information about one or more road segments and use the classification information to plan, execute, and/or modify a travel route of the autonomous vehicle. Various other entities, such as, for example, a government agency may communicate with the computer 146 and/or the public records database 170 to obtain classification information about one or more road segments and use the classification information to plan, modify, and/or repair various segments of the road 150.

FIG. 3 shows an example table 300 illustrating various levels that may be used to characterize deterioration of an object in accordance with an embodiment of the disclosure. The object can be, for example, an autonomous vehicle, a road, a road marking (a lane marking, for example), a traffic sign (a painted turn signal board, for example), an infrastructure object (a traffic light or a roadside IoT equipment, for example). In this example embodiment, seven deterioration levels are shown in the table 300 ranging from Level 1 to Level 7 with increasing levels indicating a greater extent of damage. In other implementations, the deterioration of an object may be characterized by fewer, or more, number of levels, and the extent of damage may be indicated in other ways such as, for example, increasing levels indicating a lesser extent of damage.

In the example table 300, Level 1 indicates no damage and Level 7 indicates a level of damage that renders the object unusable. Thus, for example, an autonomous vehicle may be usable on all roads when the autonomous vehicle is characterized by a Level 1 deterioration level and unusable for travel on all roads when the autonomous vehicle is characterized by a Level 7 deterioration level. Level 2 (nano damage) indicates a level of deterioration that may be undetectable by the human eye but may be detectable by some instruments. Level 3 (micro damage) indicates a level of deterioration that may be detectable by the human eye to some degree but can have an impact upon another object (such as, for example, a road having a Level 3 deterioration may have some adverse impact upon an autonomous vehicle traveling on the road). Level 4 (minor damage) indicates a level of deterioration that is detectable by the human eye and can be rectified (such as, for example, a road having potholes that can be filled). Level 5 (moderate damage) indicates a level of deterioration that is detectable by the human eye and can be rectified with a significant amount of work (such as, for example, a road that requires re-paving). Level 6 (major damage) indicates a level of deterioration that renders the object unreliable for use (such as, for example, a road having potholes that are very large and may fill up with water during rainfall). Level 7 (unusable) indicates a level of deterioration that renders the object completely unusable (such as, for example, a road that includes a bridge that has collapsed).

Figure 4:
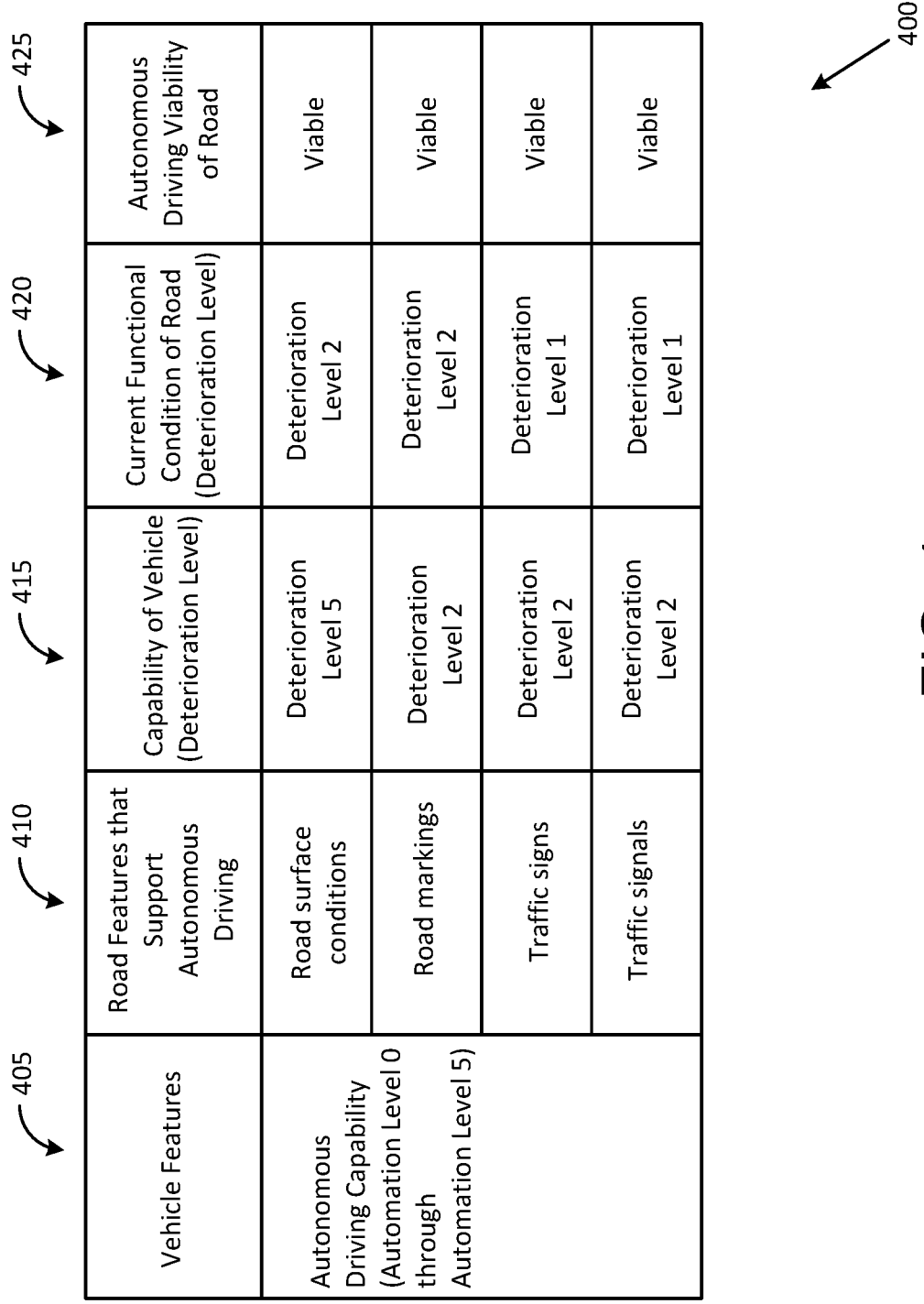
FIG. 4 shows an example table illustrating parameters that may be used to determine a viability of a road to support autonomous vehicle operations in accordance with an embodiment of the disclosure.

FIG. 4 shows an example table 400 illustrating some example parameters that may be used to determine a viability of a road to support autonomous vehicle operations in accordance with an embodiment of the disclosure. Column 405 of the table 400 indicates an autonomous driving capability of a vehicle. The autonomous driving capability of a vehicle may be characterized in various ways such as, for example, by using the six levels of automation defined by the Society of Automotive Engineers (SAE) (Level 0 (fully manual) through Level 5 (fully autonomous)). In another implementation, column 405 of the table 400 can include a set of components that provides an indication of an autonomous driving capability of a vehicle, such as, for example various devices of a sensor system used by the vehicle for autonomous driving.

Column 410 contains an example list of road features that support autonomous driving operations. Column 415 indicates a capability of a vehicle (indicated in terms of deterioration levels) with respect to the various road features listed in column 410. Column 420 indicates a current functional condition of the road (indicated in terms of deterioration levels) with respect to the various road features listed in column 410. Column 425 indicates a viability of the road for autonomous driving operations based on evaluating a compatibility between the current functional condition of the road and the condition of the vehicle with respect to the various road features.

In the example scenario illustrated in table 400, the road is deemed viable for autonomous driving operations in terms of road surface conditions, based on the road having a road surface condition corresponding to Level 2 (nano damage) and the vehicle having a condition corresponding to Level 5 (moderate damage). The road surface condition of the road is better than a threshold road surface condition required for use of the road by the vehicle in this instance. More particularly, the threshold road surface condition requirement in this case is Level 5 (moderate damage), corresponding to the deterioration level of the vehicle (Level 5). A road having a poorer deterioration level in terms of road surface conditions, such as, for example, Level 6 (major damage) or Level 7 (unusable) would render the road unviable for use by the vehicle.

In the example scenario illustrated in table 400, the road is deemed viable for autonomous driving operations in terms of road markings, based on the road having current road markings corresponding to Level 2 (nano damage) and the vehicle having a condition corresponding to Level 2 (nano damage). The threshold road markings requirement in this case corresponds to a Level 2 deterioration level. A road having a poorer deterioration level such as, for example, Level 3 (micro damage) or Level 6 (major damage), would render the road unviable for use by the vehicle due to various reasons, such as, for example, because travel on the road may potentially cause damage to the vehicle.

In the example scenario illustrated in table 400, the road is deemed viable for autonomous driving operations in terms of traffic signs, based on the road having traffic signs corresponding to Level 1 (no damage) and the vehicle having a condition corresponding to Level 2 (nano damage). The threshold traffic signs requirement in this case corresponds to a Level 2 deterioration level. A road having traffic signs with a poorer deterioration level such as, for example, Level 6 (major damage), would render the road unviable for use by the vehicle due to various reasons, such as, for example, because the traffic signs (a painted turn signal board, for example) would be sub-standard for use by the automation provided in the vehicle.

In the example scenario illustrated in table 400, the road is deemed viable for autonomous driving operations in terms of traffic signals, based on the road having traffic signals corresponding to Level 1 (no damage) and the vehicle having a condition corresponding to Level 2 (nano damage). The threshold traffic signals requirement in this case corresponds to a Level 2 deterioration level. A road having traffic signals with a poorer deterioration level such as, for example, Level 6 (major damage), would render the road unviable for use by the vehicle due to various reasons, such as, for example, because the traffic signals would be substandard for use by the automation provided in the vehicle.

Figure 5:
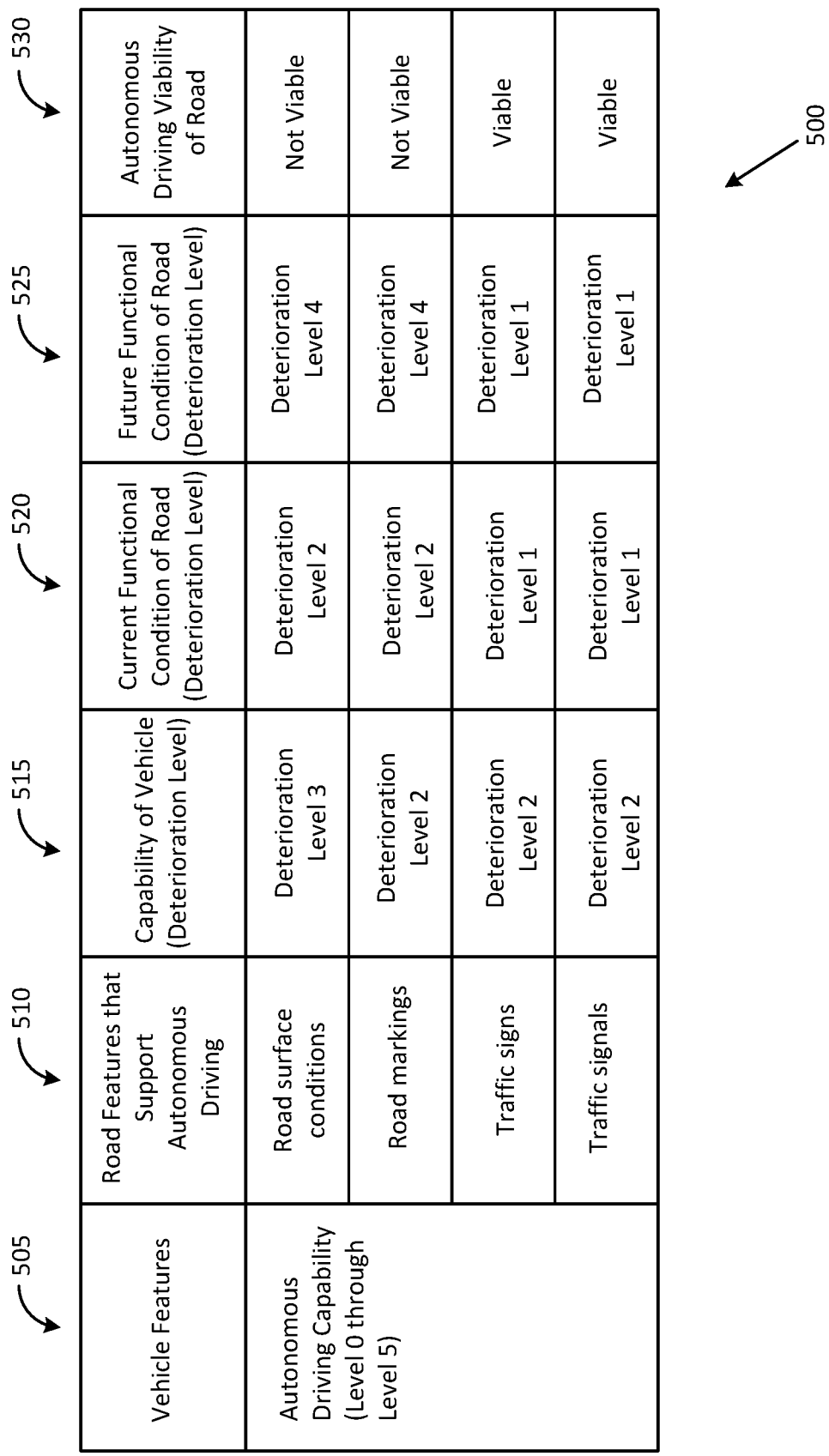
FIG. 5 shows another example table illustrating parameters that may be used to determine a viability of a road to support autonomous vehicle operations in accordance with an embodiment of the disclosure.

FIG. 5 shows an example table 500 illustrating some example parameters that may be used to determine a viability of a road to support autonomous vehicle operations in the future in accordance with an embodiment of the disclosure. The example table 500 includes column 505 that is identical to column 405 of the table 400, column 510 that is identical to column 510 of the table 400, column 515 that is slightly modified version of column 415 of the table 400 (one entry corresponding to road surface conditions is changed from Level 5 to Level 3), column 520 that is identical to column 420 of the table 400, column 525 that indicates a future functional condition of a road (indicated in terms of deterioration levels) with respect to the various road features listed in column 510, and column 530 that indicates a viability of the road to support autonomous vehicle operations in the future based on evaluating a compatibility between the future functional condition of the road and the condition of the vehicle with respect to the various road features.

The future functional condition of the road (column 525) may be obtained by executing a prediction procedure in the computer 146 in the manner described above with reference to FIG. 2, for example. In an example implementation, the prediction procedure for predicting the future functional condition of the road may be based on the current functional condition of the road indicated in column 520. The current functional condition of the road can correspond to a first instant in time and the future functional condition of the road can correspond to a second instant in time that occurs subsequent to the first instant in time. In an example scenario, the first instant in time can correspond to a time of execution of the prediction procedure and the second instant in time can correspond to a subsequent time such as, for example, several years later.

In the example scenario illustrated in table 500, the road is deemed "not viable" (unviable) for future autonomous driving operations in terms of road surface conditions, based on the road having a road surface condition that is predicted to deteriorate from a Level 2 (nano damage) to a Level 4 (minor damage) over time and the vehicle having a condition corresponding to Level 3 (micro damage). The road surface condition of the road is lower than a threshold road surface condition required for use of the road by the vehicle in this instance. More particularly, the threshold road surface condition requirement in this case corresponds to the Level 3 deterioration level of the vehicle. A road having a poorer deterioration level in terms of road surface conditions, such as, for example, Level 4 (minor damage) renders the road unviable for use by the vehicle.

The road is deemed unviable for autonomous driving operations in terms of road markings, based on the road having a road surface condition that is predicted to deteriorate from a Level 2 (nano damage) to a Level 4 (minor damage) over time and the vehicle having a condition corresponding to Level 2 (nano damage). The road surface condition of the road is lower than a threshold road markings requirement for use of the road by the vehicle in this instance. More particularly, the threshold road surface condition requirement in this case corresponds to the Level 2 deterioration level of the vehicle. A road having a poorer deterioration level such as, for example, Level 4 (minor damage) renders the road unviable for use by the vehicle due to various reasons, such as, for example, because travel on the road may potentially cause damage to the vehicle.

The future functional condition of the road with respect to traffic signs, traffic signals, and infrastructure objects remains unchanged with respect to the current functional condition of the road. Consequently, the road is viable for autonomous driving operations in these categories.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the computer 146 or in a vehicle computer, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   generating, by a sensor system of a first vehicle, sensor data comprising a current condition of a road, wherein the sensor system comprises at least one of a camera, a radar device, a light detection and ranging (LIDAR) device, and an Internet-of-Things (IoT) device, and wherein at least a portion of the sensor data is autonomously generated by the camera, the radar device, the LIDAR device, and/or the IoT device in communication with the first vehicle;
   receiving, from one or more databases, road records data and road features data associated with the road;
   receiving, from the one or more databases, road cartographic data including map information associated with the road;
   receiving, by one or more processors and from the first vehicle, the sensor data;
   receiving, by the one or more processors and from one or more other vehicles, crowd-sourced data comprising road-related information;
   predicting, by the one or more processors, a functional condition of the road based on evaluating the sensor data in combination with the crowd-sourced data, wherein the functional condition is a future condition of the road;
   identifying, by the one or more processors and based on the current condition of the road, and/or the future condition of the road, a first deterioration value for the road, the first deterioration value associated with at least one of one or more road markings, traffic signs, traffic signals, and/or infrastructure elements that support autonomous driving operations;
   determining, by the one or more processors and based on the functional condition of the road, the first deterioration value, the road records data, the road features data, and the road cartographic data, a level of support offered by the road for autonomous driving operations;
   assigning, by the one or more processors, the road a first classification based on the level of support offered by the road for autonomous driving operations;
   determining, by the one or more processors, a second deterioration value associated with the first vehicle, wherein the second deterioration value provides an indication of an ability of the first vehicle to autonomously travel on any road;

comparing the first deterioration value and the second deterioration value;
determining that the first deterioration value is less than or equal to the second deterioration value;
determining, by the one or more processors, first autonomous driving capabilities of the first vehicle with respect to the one or more road markings, traffic signs, traffic signals, and/or infrastructure elements that support autonomous driving operations;
determining, by the one or more processors and based on the first classification assigned to the road, the determination that the first deterioration value is less than or equal to the second deterioration value, and the first autonomous driving capabilities of the first vehicle, a viability of the first vehicle to travel on the road;
autonomously re-routing, by the first vehicle, the first vehicle based on the level of support offered by the road; and
recommending, by the one or more processors, one or more repairs to address the first deterioration value and/or the second deterioration value.

2. The method of claim 1, wherein predicting the future condition comprises using a deterioration model that is based on an effect of an environmental condition upon a surface of the road over a period of time.

3. The method of claim 2, wherein the environmental condition is a weather condition.

4. The method of claim 1, further comprising:
receiving infrastructure data of the road; and
predicting the functional condition of the road based on evaluating the sensor data in combination with the crowd-sourced data and the infrastructure data.

5. The method of claim 4, wherein the infrastructure data comprises records of roadwork performed upon the road.

6. The method of claim 1, wherein the crowd-sourced data comprises second sensor data comprising a second functional condition of the road.

7. A method comprising:
generating, by a first sensor system of a first vehicle, first sensor data comprising a current condition of a road, wherein the first sensor system comprises at least one of a camera, a radar device, a light detection and ranging (LIDAR) device, and an Internet-of-Things (IoT) device, and wherein at least a portion of the first sensor data is autonomously generated by the camera, the radar device, the LIDAR device, and/or the IoT device in communication with the first vehicle;
providing, by the first vehicle, the first sensor data;
predicting a future functional condition of the road based on evaluating a current functional condition of the road, wherein evaluating the current functional condition of the road comprises evaluating the first sensor data in combination with crowd-sourced data comprising road-related information, the crowd-sourced data received from one or more other vehicles;
identifying, based on the current condition of the road and/or the future functional condition of the road, a first deterioration value for the road, the first deterioration value associated with at least one of one or more road markings, traffic signs, traffic signals, and/or infrastructure elements that support autonomous driving operations;
determining, based on the future functional condition of the road and the first deterioration value for the road, a level of support offered by the road for autonomous driving operations;
determining a second deterioration value associated with the first vehicle, wherein the second deterioration value provides an indication of an ability of the first vehicle to autonomously travel on any road;
comparing the first deterioration value and the second deterioration value;
determining that the first deterioration value is less than or equal to the second deterioration value;
determining first autonomous driving capabilities of the first vehicle with respect to the one or more road markings, traffic signs, traffic signals, and/or infrastructure elements that support autonomous driving operations, based at least in part on a maintenance condition of the first vehicle;
determining, based on the future functional condition of the road, the determination that the first deterioration value is less than or equal to the second deterioration value, and the first autonomous driving capabilities of the first vehicle, a viability of the first vehicle to travel on the road;
autonomously re-routing, by the first vehicle, the first vehicle based on the level of support offered by the road; and
recommending one or more repairs to address the first deterioration value and/or the second deterioration value.

8. The method of claim 7, wherein evaluating the current functional condition of the road further comprises using a deterioration model that is based on an effect of an environmental condition upon a road surface.

9. The method of claim 7, further comprising:
assigning a first classification to the road based on evaluating the current functional condition of the road; and
changing the first classification to a second classification based on evaluating the future functional condition of the road; and
determining, based on the second classification, the viability of the first vehicle to travel on the road.

10. The method of claim 9, further comprising:
determining, based on the first autonomous driving capability of the first vehicle and the first classification of the road, that the road is viable for current travel by the first vehicle.

11. The method of claim 10, further comprising:
determining, based on the first autonomous driving capability of the first vehicle and the second classification of the road, that the road is not viable for future travel by the first vehicle.

12. The method of claim 11, further comprising:
determining a second autonomous driving capability of a second vehicle; and
determining, based on the second autonomous driving capability of the second vehicle and the second classification of the road, that the road is viable for future travel by the second vehicle.

13. The method of claim 12, further comprising:
generating, by a second sensor system of the second vehicle, second sensor data,
wherein evaluating the current functional condition of the road further comprises evaluating the second sensor data in combination with the first sensor data and the crowd-sourced data, and wherein the first sensor data and the second sensor data are associated with the one or more road markings, traffic signs, traffic signals, and/or infrastructure elements that support autonomous driving operations.

14. A system comprising:
a memory that stores computer-executable instructions; and
a processor configured to execute the computer-executable instructions to:
  generate, by a first sensor system of a first vehicle, first sensor data comprising a first functional condition of a road, wherein the first functional condition is a current functional condition, wherein the first sensor system comprises at least one of a camera, a radar device, a light detection and ranging (LIDAR) device, and an Internet-of-Things (IoT) device, and wherein at least a portion of the first sensor data is autonomously generated by the camera, the radar device, the LIDAR device, and/or the IoT device in communication with the first vehicle;
  receive, from one or more databases, road records data and road features data associated with the road;
  receive, from the one or more databases, road cartographic data including map information associated with the road;
  receive, from the first vehicle, the first sensor data;
  receive, from one or more other vehicles, crowd-sourced data comprising road-related information;
  predict a future functional condition of the road based on evaluating the first sensor data in combination with the crowd-sourced data;
  identify, based on the current functional condition of the road, and/or the future functional condition of the road, a first deterioration value for the road, the first deterioration value associated with at least one of one or more road markings, traffic signs, traffic signals, and/or infrastructure elements that support autonomous driving operations;
  determine, based on the future functional condition of the road, the first deterioration value the roads records data, the road features data, and the road cartographic data a level of support offered by the road for autonomous driving operations;
  assign, to the road, a first classification based on the level of support offered by the road for autonomous driving operations;
  determine a second deterioration value associated with the first vehicle, wherein the second deterioration value provides an indication of an ability of the first vehicle to autonomously travel on any road;
  compare the first deterioration value and the second deterioration value;
  determine that the first deterioration value is less than or equal to the second deterioration value;
  determine first autonomous driving capabilities of the first vehicle with respect to the one or more road markings, traffic signs, traffic signals, and/or infrastructure elements that support autonomous driving operations;
  determine, based on the first classification of the road, the determination that the first deterioration value is less than or equal to the second deterioration value, and the first autonomous driving capabilities of the first vehicle, a viability of the first vehicle to travel on the road;
  autonomously re-route, by the first vehicle, the first vehicle based on the level of support offered by the road; and
  recommend one or more repairs to address the first deterioration value and/or the second deterioration value.

15. The system of claim 14, wherein evaluating the first sensor data comprises using a deterioration model that is based on an effect of an environmental condition upon a road surface.

16. The system of claim 14, wherein the first sensor data is associated with the one or more road markings, traffic signs, traffic signals, and/or infrastructure elements that support autonomous driving operations.

17. The system of claim 14, wherein the processor is further configured to:
  determine, based at least in part on the first deterioration value of the first vehicle, a first autonomous driving capability of the first vehicle; and
  determine, based on the first classification of the road and the first autonomous driving capability of the first vehicle, a viability of the first vehicle to travel on the road.

18. The system of claim 17, wherein the processor is further configured to:
  determine, based on the first autonomous driving capability of the first vehicle and the first classification of the road, that the road is not viable for future travel by the first vehicle.

19. The system of claim 17, wherein the processor is further configured to:
  determine a second autonomous driving capability of a second vehicle; and
  determine, based on the second autonomous driving capability of the second vehicle and the first classification of the road, that the road is viable for future travel by the second vehicle.

* * * * *